United States Patent [19]
Byles et al.

[11] 3,991,416
[45] Nov. 9, 1976

[54] AC BIASED AND RESONATED LIQUID CRYSTAL DISPLAY

[75] Inventors: William R. Byles, Los Angeles; John E. Jensen, Santa Monica; Michael J. Little, Tarzana; Michael N. Ernstoff, Los Angeles, all of Calif.

[73] Assignee: Hughes Aircraft Company, Culver City, Calif.

[22] Filed: Sept. 18, 1975

[21] Appl. No.: 614,463

[52] U.S. Cl. ............................ 340/324 R; 340/336; 350/160 LC
[51] Int. Cl.² ........................................ G06F 3/14
[58] Field of Search .............. 58/23 R, 23 BA; 350/160 LC; 340/324 M, 324 R, 336

[56] References Cited
UNITED STATES PATENTS

| 3,718,381 | 2/1973 | Assooline et al. ............ 350/160 LC |
| 3,886,724 | 6/1975 | Kamiya ............................. 58/23 BA |

*Primary Examiner*—Marshall M. Curtis
*Attorney, Agent, or Firm*—W. H. MacAllister, Jr.; Martin E. Gerry

[57] ABSTRACT

A liquid crystal device biased by an alternating current having a predetermined frequency higher than the dispersion frequency of the liquid crystal material. The liquid crystal device exhibits inherent capacitance across its input terminals which is resonated by an inductor to result in a higher bias current and reduction of image smear of images displayed by such device.

7 Claims, 2 Drawing Figures

AC BIASED AND RESONATED LIQUID CRYSTAL DISPLAY

BACKGROUND OF THE INVENTION

This invention is in the field of liquid crystal devices.

Background information discloses that AC bias decreases the decay time of optical pulse signals through liquid crystal material. Such decay time decrease tends to smear pictorial image displays using liquid crystals.

It has been erroneously believed that an optimum frequency for biasing liquid crystal cells should be in the order of 10 kilohertz for crystal cells operating in the specular mode.

Further, the biasing frequency in the prior art, was limited to one which is below the dispersion frequency of the liquid crystal material, and use of biasing frequencies above the liquid crystal dispersion frequency was believed to result in inoperative liquid crystal devices.

Still further, no attempt was made to resonate the inherent capacitance between the electrodes of the liquid crystal, sandwiching the liquid crystal material therebetween, so as to obtain higher bias currents and change the impedance of the biasing circuit including the capacitive elements of the liquid crystal device, so that such device would appear to be completely resistive, thereby lowering the impedance of the biased circuit at the biasing frequency.

SUMMARY OF THE INVENTION

It is therefore, an objective of this invention to utilize an AC biasing frequency that will assist in decreasing decay time of light pulses through the liquid crystal material and thereby avoid or reduce pictorial image smear.

It is another objective of this invention to utilize a biasing frequency which is above the dispersion frequency of the liquid crystal material irrespective of the prior art belief to limit such biasing frequency to a specific number.

It is yet a further objective of this invention to improve operative performance by resonating the inherent capacitance of the liquid crystal element utilizing an inductance whose reactance is substantially equal to the reactance of such inherent capacitance thereby increasing the biasing current and eliminating reactive components in the biasing circuit.

Briefly, according to this invention, the parallel plates between which the liquid crystal material is sandwiched are connected to an appropriate inductor in combination with a biasing frequency source that powers the inductor and the plates of the liquid crystal device. A biasing frequency above the dispersion frequency of the liquid crystal material is used. The inductor is so chosen so that its reactance at the biasing frequency is equal to the reactance of the inherent capacitance of the liquid crystal device.

DETAILED DESCRIPTION

Figure 1:
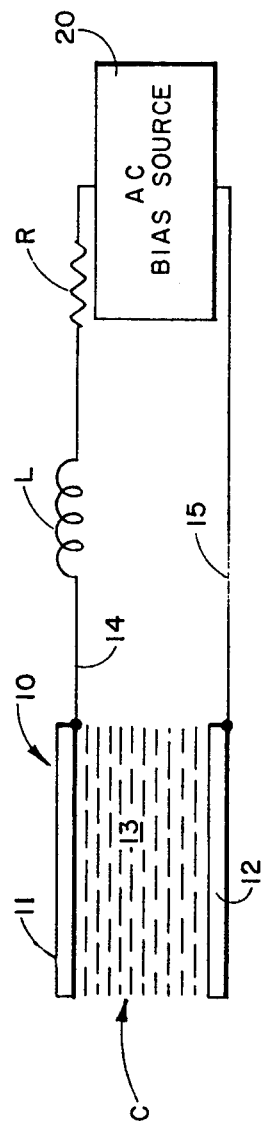
FIG. 1 is a schematic representation of a liquid crystal cell connected in series with a resonating inductor and an AC bias source.

Referring to FIG. 1, a liquid crystal device is represented schematically at 10.

Electrode plates of such device is shown at 11 and 12 with liquid crystal material at 13 sandwiched therebetween. Thus such device exhibits an inherent capacitance C between wire leads 14 and 15 that are connected respectively to plates 11 and 12 which for example could be the counter electrode and substrate electrode respectively. As is well known in the art, both these electrodes are distributed to provide the AC bias to all liquid crystal cells of like construction. A typical capacitance of C is about 10,000 pF.

Plate 11 is connected by wire 14 to inductor L that has an inherent series resistance R due to resistance of the wire comprising the inductor. Such inductor is connected to AC biasing source 20 chosen herein at 100 kilohertz, which is a frequency above the dispersion frequency of typical liquid crystal material 13. The return side of source 20 is connected by means of wire 15 to plate 12 thus placing source 20 and inductor L in series with the plates of the capacitor as at C. The value of inductance L to achieve resonance with capacitor C at 100 kilohertz is approximately 0.3 millhenries.

Such circuit achieving series resonance of L and C will be used whenever the impedance of source 20 is low.

Therefore, at resonance, the reactance of capacitance C is compensated by the reactance of inductor L and the circuit looking into device and appears to be resistive only.

Being at resonance, and the circuit total reactances being zero, the impedance will be only resistive thereby increasing the biasing current to device 10 and decreasing decay time of optical or light input pulses to the device, with consequent reduction of image smear.

Figure 2:
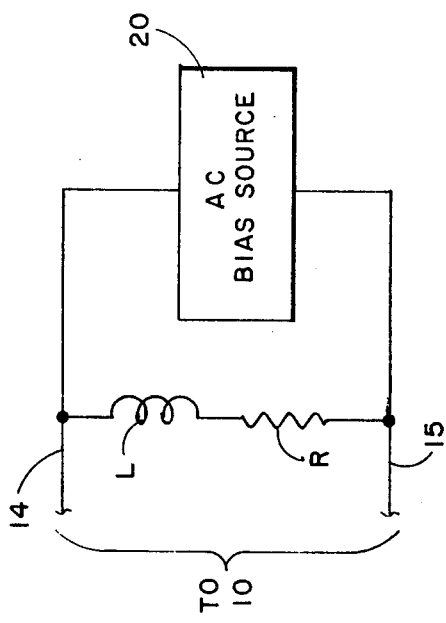
FIG. 2 is a schematic representation of the same liquid crystal cell wherein the resonating inductor is connected in parallel with the cell.

Referring to FIG. 2, leads 14 and 15 are also respectively connected to plates 11 and 12 of device 10 so that inductance L with its inherent resistance R will shunt the effective capacitance C of device 10. Bias frequency source 20 will be connected in parallel with leads 14 and 15. Since the same values of L, C and frequency of source 20 are used as in FIG. 1, L and C will resonante at the frequency of source 20. However the impedance across leads 14 and 15 will be high as compared to impedance across leads 14 and 15 in FIG. 1. This is because the circuit is a parallel resonant circuit, which is needed when the internal impedance of source 20 is high to obtain maximum energy transfer from source 20 into the circuit comprising L and C. Within the tank circuit of L and C the impedance will be low since reactance due to L will have compensated for the reactance due to C thereby causing a high circulating bias current through C and consequently through device 10 to obtain the same beneficial results as discussed in connection with FIG. 1 circuit.

We claim:

1. A liquid crystal cell having electrodes and liquid crystal material therebetween, biased by an alternating current source at a predetermined alternating current frequency during operative mode of said cell, said cell exhibiting capacitance across said electrodes, the improvement comprising:

an inductor electrically connected to at least one of said electrodes and to said source, forming a resonant circuit with said capacitance at the predetermined frequency.

2. The invention as stated in claim 1, wherein the predetermined frequency is higher than the dispersion frequency of the liquid crystal material.

3. The invention as stated in claim 1, wherein the inductor is serially connected between the electrodes and source.

4. The invention as stated in claim 1, wherein the inductor is connected in parallel with the electrodes and the source.

5. A method for increasing performance of a liquid crystal cell biased at a predetermined frequency, comprising the steps of:
 biasing the cell with an alternating current having a frequency greater than dispersion frequency of the liquid crystal material in said cell during operative mode of the cell; and
 resonating the inherent capacitance of the liquid crystal cell with an inductor, connected to the cell and the source, at the predetermined bias frequency.

6. The method as in claim 5, wherein the inductor forms a series resonant circuit with the inherent capacitance of the cell.

7. The method as in claim 5, wherein the inductor forms a parallel resonant circuit with the inherent capacitance of the cell.

* * * * *